United States Patent
Liu et al.

(10) Patent No.: US 6,879,500 B2
(45) Date of Patent: *Apr. 12, 2005

(54) APPARATUS FOR NOISE CURRENT REDUCTION IN POWER CONVERTERS

(75) Inventors: Chui-Pong Joe Liu, Hong Kong (CN); Ngai-Kit Franki Poon, Hong Kong (CN); Man-Hay Bryan Pong, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 10/643,859

(22) Filed: Aug. 19, 2003

(65) Prior Publication Data

US 2004/0032753 A1 Feb. 19, 2004

Related U.S. Application Data

(63) Continuation-in-part of application No. 10/308,994, filed on Dec. 2, 2002, now abandoned, which is a continuation of application No. 09/939,068, filed on Aug. 24, 2001, now Pat. No. 6,490,181.

(51) Int. Cl.[7] .............................................. H02M 1/12
(52) U.S. Cl. ...................................................... 363/40
(58) Field of Search .............................. 363/39, 40, 47, 363/48

(56) References Cited

U.S. PATENT DOCUMENTS

| 4,683,529 | A | * | 7/1987 | Bucher, II | 363/44 |
|---|---|---|---|---|---|
| 4,888,675 | A | * | 12/1989 | Kumar et al. | 363/47 |
| 5,077,543 | A | * | 12/1991 | Carlile | 333/177 |
| 5,111,373 | A | * | 5/1992 | Higaki | 363/37 |
| 5,319,535 | A | * | 6/1994 | Brennen | 363/40 |
| 5,636,112 | A | * | 6/1997 | Faulk | 363/48 |
| 5,905,642 | A | * | 5/1999 | Hammond | 363/37 |
| 6,122,184 | A | * | 9/2000 | Enjeti et al. | 363/47 |
| 6,137,392 | A | * | 10/2000 | Herbert | 336/175 |
| 6,288,915 | B1 | * | 9/2001 | Stemmler et al. | 363/34 |
| 6,490,181 | B1 | * | 12/2002 | Liu et al. | 363/40 |

* cited by examiner

*Primary Examiner*—Jeffrey Sterrett
(74) *Attorney, Agent, or Firm*—Dickstein, Shapiro, Morin & Oshinsky, L.L.P.

(57) ABSTRACT

An apparatus for reducing electromagnetic interference due to common mode current in power converters is disclosed. Common mode current flowing through high parasitic capacitance on the load side typically contributes significantly to the electromagnetic interference. In order to reduce the electromagnetic interference the common mode current is reduced by reducing the voltage driving a current through the high parasitic capacitance. A counter-acting voltage source produces a voltage out of phase with the voltage driving the common mode current. Such a counter-acting voltage is obtained with the aid of a winding coupled to the magnetic component in the power converter or by one or more active components. The counter-acting winding is wound with the secondary and primary windings to share the same magnetic core.

21 Claims, 11 Drawing Sheets

APPARATUS FOR NOISE CURRENT REDUCTION IN POWER CONVERTERS

CROSS-REFERENCE TO RELATED APPLICATIONS

This application is continuation-in-part of the U.S. patent application Ser. No. 10/308,994 filed on Dec. 2, 2002, now abandoned, which is a continuation of U.S. patent application Ser. No. 09/939,068 filed on Aug. 24, 2001, which issued as U.S. Pat. No. 6,490,181.

FIELD OF THE INVENTION

This invention relates to the field of power converters, and in particular to reducing noise due to generation of Electromagnetic Interference by power converters.

BACKGROUND OF THE INVENTION

A power converter provides power by converting power from a source into a form suitable for a load of interest. For instance, a power converter can provide DC power from an AC source. An acceptable commercially viable power converter needs to ensure that the Electromagnetic Interference (EMI) generated by its operation does not exceed acceptable levels. While there are many mechanisms responsible for the generation of EMI, a well-known component of EMI is common mode noise. A switching power converter generates common mode noise as a result of the switching operations in the presence of a low impedance path to ground. Typically, common mode noise due to common mode current flow makes up a significant fraction of the electromagnetic interference (EMI) generated by a switching power converter.

In a switching power converter, the switching circuit receives input power from the input terminals and then produces a switching waveform across the main transformer. The switching waveform so produced is coupled through inter-winding capacitance as well as secondary winding to the secondary side. This secondary winding feeds power to the rectifying circuit which in turn produces power to the load.

In addition to the above described power distribution, there is a path for common mode current responsible for the common mode noise. Switching operations generate noise, which is coupled through transformer inter-winding capacitance to the secondary side. In general the load is isolated from earth but it has fairly high capacitance coupled to earth. This capacitance, together with transformer inter-winding capacitance provides a path for common mode current to flow through the power source impedance by completing the circuit. Any current through the detected power source impedance contributes to conducted electromagnetic interference. The complete common mode current path has a noise source coupled with inter-winding capacitance, which, in turn, forms a complete loop with the power source impedance and the parasitic capacitance on the load side.

Reduction of common mode noise in switching power converters presents a difficult problem. In particular, a switch mode power converter with isolation transformers presents numerous challenges. Usually this type of power converter has close coupling between the primary and secondary windings. Such close coupling reduces leakage inductance and improves conversion efficiency. However, the close coupling, i.e., high transformer coupling coefficient, increases inter-winding capacitance between the primary and the secondary windings and this increases undesirable noise coupling from the primary side to the secondary load side.

Typically, a bypass capacitor connecting two "non-switching" nodes on the primary side and the secondary side respectively reduces the common mode current. A usual choice of nodes is one of the input terminals and the secondary common node. This reduces the common mode current coupled through parasitic capacitance between the load and earth. However this method has its limitations. Safety standards prevent use of high-capacitance because this will increase leakage current between the primary and secondary side.

Placing a sheet of shielding metal known as the "Faraday shield" between the secondary and primary windings also reduces the common mode current. This strategy works on the same principle as the bypass capacitor and provides an additional shunt path for the noise current. It effectively provides another capacitance path in parallel with the bypass capacitor. However, the shield makes the transformer very bulky and reduces magnetic coupling between primary and secondary windings. In turn, this reduces the converter efficiency—an undesirable outcome.

Yet another commonly known method exploits passive filtering by making use of bulky filtering components to suppress noise. This method is widely used but is becoming increasingly undesirable due to the additional components required and the resulting large size of the device.

In U.S. Pat. No. 6,137,392, Edward Herbert's invention uses two or more transformers connected in series to reduce the overall parasitic capacitance between primary and secondary windings. This approach also requires additional magnetic components and tedious magnetic component construction. Moreover, theoretically this approach cannot completely eliminate noise coupling through the isolation transformer.

SUMMARY OF THE INVENTION

The present invention significantly reduces the undesirable common mode noise generated due to the flow of common mode current. The invention provides a counter-acting voltage to reduce or even eliminate the common mode current. The counter-acting voltage source and the components connected in series to it actively operate to absorb, bypass or cancel out the noise generated by the operation of the power converter.

A preferred embodiment of the invention comprises a counter-acting voltage derived from a set of windings in the main transformer with further fine-tuning by external passive components. Typically, the external passive components include capacitors to maintain electrical isolation between the transformer and secondary windings. Moreover, the combination of voltage source and series components is conveniently coupled to "non-switching" nodes on the primary and secondary sides.

Alternative preferred embodiments of the invention generate the counter-acting voltage with a buffer amplifier. Such an amplifier senses the noise voltage of the series connected components and produces an out of phase voltage with similar amplitude in order to reduce the noise voltage across the path.

In a preferred embodiment of the invention, the counter-acting source is controlled actively by amplifying components and suitable feedback. The amplifying components in response to detecting generated noise provide a counter-acting voltage to prevent the noise current from coupling through external earth. Furthermore, the present invention is easily extended to reduce electromagnetic interference due to non-isolated converters.

The invention enables noise reduction with a simple and low component count method with transformer conveniently built in accordance with well-known techniques. Moreover, the present invention provides noise reduction without requiring precise adjustment of difficult to control parameters such as transformer leakage inductance.

A preferred embodiment of the invention includes a common mode noise reducing apparatus for reduction of common mode noise in a switching power converter, the common mode noise reducing apparatus comprising: means for sensing a signal potential difference that is at least in part due to the common mode noise; a voltage generating source producing a counter-acting voltage that reduces the signal potential difference; and a series impedance coupled to the voltage generating source such that the series impedance is also in a path through which the common mode noise can flow, whereby the series impedance effectively produces a short circuit for the common mode noise with the aid of the counter-acting voltage.

In preferred embodiment of the invention the voltage generating source may be a counter-acting winding coupled to a primary winding and a secondary winding in a transformer in the switching power converter. The voltage generating source may include an amplifying device having at least one input connection receiving the signal potential difference and at least one output connection coupled to the path effectively short circuiting the common mode noise.

In preferred embodiment of the invention the means for sensing the signal potential difference may include an impedance connected in series in the path through which the common mode noise can flow, which path includes nodes on both the input and the output sides of the switching power converter; or a counter-acting winding magnetically coupled to the primary winding and the secondary winding. Further, the counter-acting winding is, preferably, wound on a bobbin with the primary and the secondary winding of the transformer in the switching power converter such that the secondary winding is between the primary winding and the counter-acting winding. Preferably, the primary winding and the counter-acting winding have substantially the same number of turns. Moreover, preferably, the secondary winding is positioned between the primary and the counter-acting windings such that the sum of switching noise generated by the primary and the counter-acting windings is substantially reduced in the secondary winding.

To better provide isolation between the input and the output sides, the present invention further comprises a capacitor coupled in series in a path that includes, the counter-acting winding, a terminal on the input side and a terminal on the output side for reducing the common mode noise. Preferably, the capacitor is coupled to one or more of a first node separated from an output terminal by a low impedance and a second node separated from an input terminal by a low impedance. In addition, optionally, the apparatus may include one or more electromagnetic noise-filtering elements.

The present invention also encompasses a method for reducing common mode noise by, for instance, providing a switching power converter having an input side terminal and an output side terminal; providing means for sensing a signal potential difference corresponding to a common mode noise; providing an amplifying device having at least one input connection that receives the signal potential difference, and at least one output connection that provides a counter-acting voltage in response to the signal potential difference; and providing means for coupling the at least one output connection of the amplifying device to a path connecting the input terminal to the output terminal whereby the counter-acting voltage produced by the amplifying device reduces the potential difference between the input side terminal and the output side terminal.

Preferably, the means for sensing a signal potential difference include a counter-acting winding that produces a counter-acting voltage, which winding is wound on a bobbin with a primary and a secondary winding of a transformer in the switching power converter such that the secondary winding is between the primary winding and the counter-acting winding. Preferably, but not as a requirement, the primary winding and the counter-acting winding have substantially the same number of turns. As previously described, the secondary winding is preferably placed between the primary and the counter-acting windings such that the sum of switching noise generated by the primary and the counter-acting windings is substantially reduced in the secondary winding.

These and other aspects of the present invention will become apparent to those skilled in the art from the following detailed description of the invention and from the accompanying drawings.

DETAILED DESCRIPTION OF THE INVENTION

In order to reduce or eliminate common mode current flow through the parasitic capacitance, the present invention includes a counteracting voltage source connected in series to an impedance and to the noise-generating source driving the common mode current. As a result the effective impedance of the series impedance is reduced in a manner inversely proportional to the difference between the magnitude of the counter-acting voltage source and the voltage across the series impedance without the counter-acting voltage source. In other words, the counteracting voltage works like an "impedance reducer." The resultant reduction in the noise voltage drop provides an efficient bypass for the noise source current. This bypass strategy actively absorbs the noise current more effectively than just a bypass capacitor. In other words, the strategy provides an effectively small value bypass capacitor while providing a large effective bypass capacitance for noise reduction.

Figure 1:
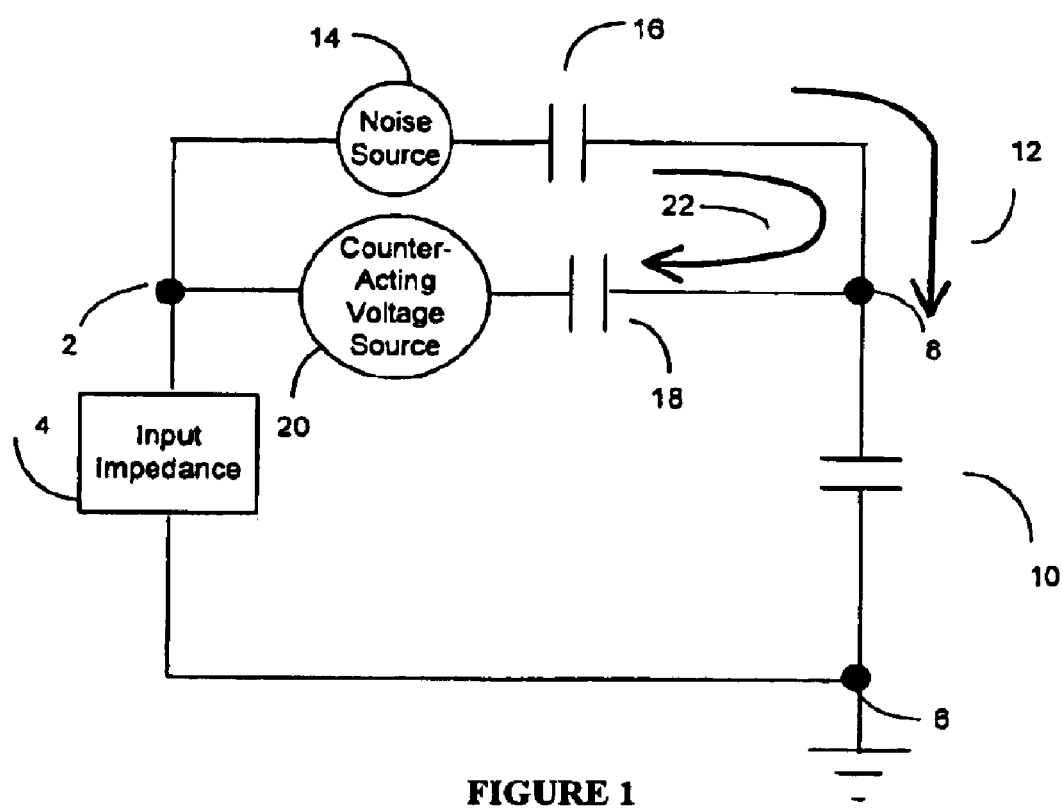
FIG. 1 is a schematic diagram of a circuit corresponding to an embodiment for reducing or canceling common mode noise in accordance with the invention.

FIG. 1 illustrates the arrangement described above. Input node 2 has an input impedance 4 with respect to the ground 6. Output node 8 exhibits a parasitic capacitance 10 relative to the ground. Parasitic capacitance 10 allows common mode current 12 to flow due to the noise source 14 connected to the series capacitance 16. This common mode current is reduced by shunting it via the series impedance 18, and further reduced by counter-acting voltage source 20.

Figure 2:
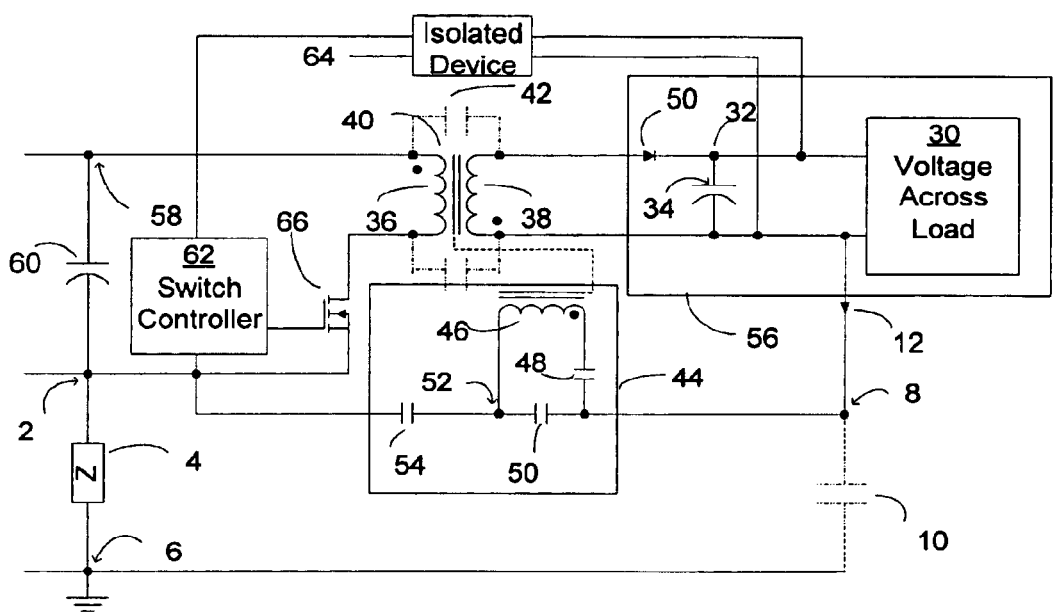
FIG. 2 is a simplified diagram showing an example of connections using magnetically coupled winding to generate the counter-acting voltage.

FIG. 2 shows an embodiment of the invention providing a counter-acting voltage to reduce common mode current. As shown, transformer 40, comprising windings 36 and 38 and the inevitably present inter-winding capacitance 42 provides power to a rectifier having, for instance, diode 50, and an output capacitor 34 connected to node 32 and across load 30. The voltage across load 30 is sensed by isolated device 64 for providing a feedback signal to the switch controller 62 for regulating the output voltage via switch 66. In addition to the above, FIG. 2 also illustrates counter-acting voltage provided by counter-acting winding 46 across voltage dividing elements 48 and 50 acting together as a passive divider for adjusting the counter-acting voltage. The adjusted counter-acting voltage reduces common mode current 12 flowing through series element 54 by reducing the voltage across series element 54. In other words, the counter-acting voltage generated in FIG. 2 reduces the potential difference between nodes 2 and 8, thus reducing common mode current 12 to ground 6.

As is apparent to one of ordinary skill in the art, the counter-acting voltage need not be provided only by counter-acting winding 46. Additional mechanisms for providing the counter-acting voltage are intended to be within the scope of the invention. Thus, the elements shown within box 44 formed by a broken line can be replaced by a voltage source providing a counter-acting voltage V and an impedance $Z_1$ in series to ensure electrical isolation between the input and output. Theoretically, for eliminating the common mode current this requires $$V = I \times Z_1 \qquad \text{Eqn. 1}$$

where I is the common mode current through impedance $Z_1$ in the presence of the voltage source V. No common mode current will flow through parasitic capacitance 10 between the load and the earth. This means the coupled noise can be perfectly bypassed and the noise coupling through by the inter-winding parasitic capacitance can be contained. In practice, the noise voltage may not be completely cancelled across node 2 and node 8 because of the error in adjusting V and $Z_1$. Therefore, at least the amplitude of the common mode current will be greatly reduced when compared with known methods. In addition, the required magnitude of impedance $Z_1$ is greatly reduced for noise immunity and effectively produces a short circuit between node 2 and node 8.

Counter-acting voltage source is realized by counter-acting winding 46 coupled to the isolation transformer 40. Counter-acting winding 46 is wound to produce counter-acting voltage. The winding voltage of isolation transformer 40 is suitable for producing the counter-acting voltage because it can produce the same waveform as the switching noise produced by switching circuit in the primary. Voltage across counter-acting winding 46 is divided by passive components as shown. With voltage-dividing element 48 having impedance $Z_3$ and voltage-dividing element 50 having impedance $Z_2$, the counter-acting voltage is obtained from the voltage across voltage-dividing element 50.

Equation 2 describes the condition in which perfect bypass can be obtained by making the voltage across the node 2 and node 8 zero at a frequency corresponding to the common mode current generated noise.

$$V = I \frac{Z_1 \times Z_2 + Z_2 \times Z_3 + Z_1 \times Z_3}{Z_2} \qquad \text{Eqn. 2}$$

Here I is the noise current coupled through inter-winding parasitic capacitance between the transformer windings 36 and 38 and V is the voltage across counter-acting winding 46. Of course, in practice, the noise voltage may not be completely cancelled because of error in adjusting impedances $Z_1$, $Z_2$ and $Z_3$ resulting in a distorted counter-acting voltage V (with respect to the noise voltage).

Figure 3:
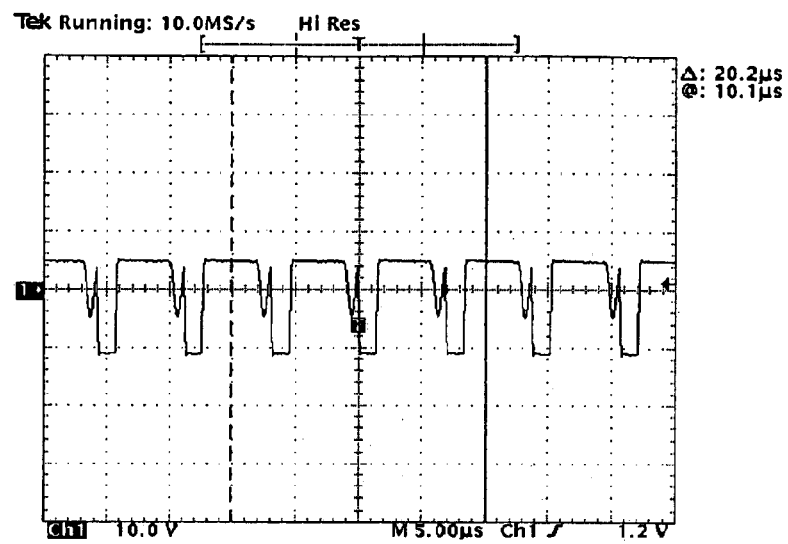
FIG. 3 shows the noise voltage across the primary and secondary of a prior art power converter.
Figure 4:
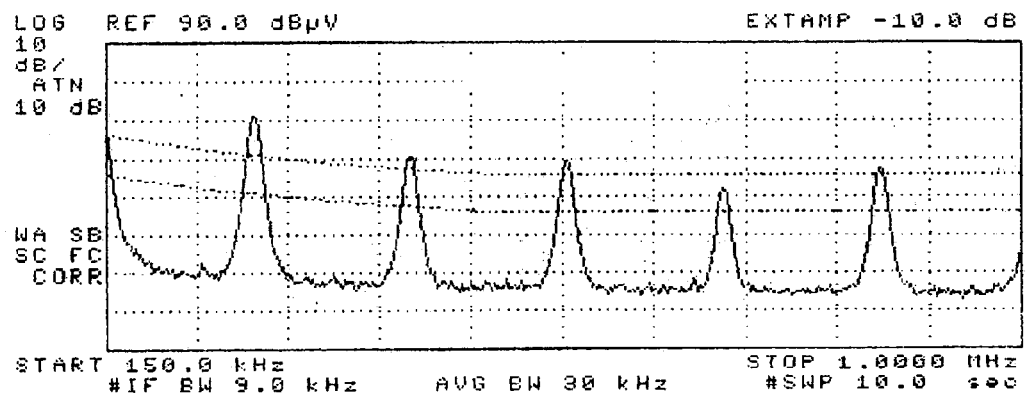
FIG. 4 illustrates the common mode current corresponding to the noise voltage of FIG. 3.
Figure 5:
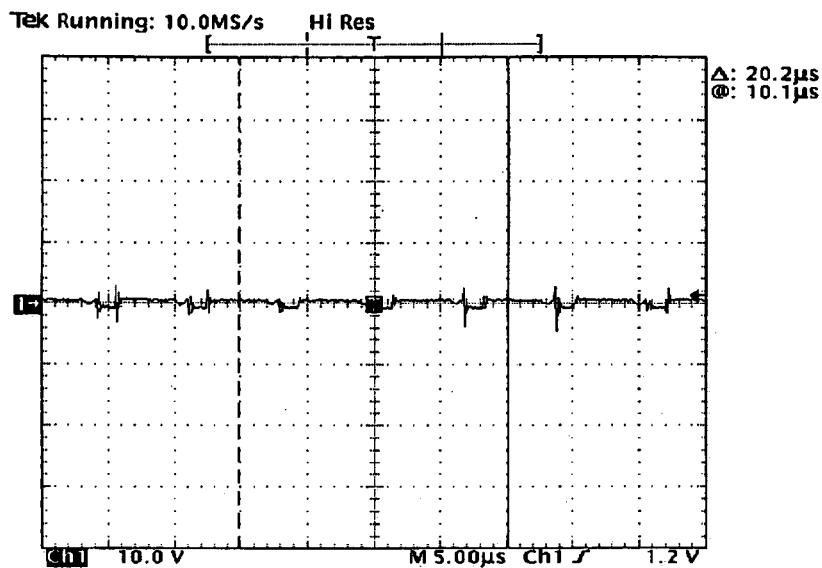
FIG. 5 shows the noise voltage across the primary and secondary non-switching nodes of the flyback converter with reduction of common mode current in accordance with the invention.
Figure 6:
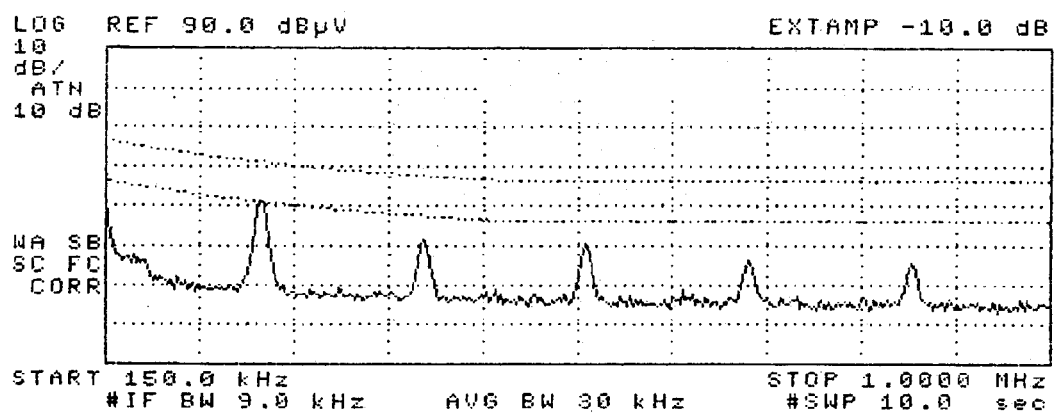
FIG. 6 illustrates the common mode current corresponding to the noise voltage of FIG. 5.

FIG. 3 shows the measured noise voltage across node 2 and node 8 without deploying counter-acting winding 46, and with voltage-dividing elements 48 and 50, series element 54 replaced by a bypass capacitor of 1500 pF. FIG. 4 shows the corresponding measured common mode current spectrum. FIG. 5 shows the measured noise voltage across node 2 and node 8 with the use of counter-acting winding 46, voltage-dividing elements 48 and 50, series element 54 as illustrated in FIG. 2. The turns ratio of windings 36, 38 and 46 are 30:10:3 and the values for series element 54, and voltage dividing elements 50 and 48 are about 1500 pF, 470 pF and 6800 pF respectively (which straightforwardly provide the respective impedance values). Notably, series element 54 has the same value as the bypass capacitor used in the previous case for fair comparison. A comparison of FIGS. 3 and 5 reveals a significant reduction in the noise voltage across node 2 and node 8. The corresponding common mode current spectrum is shown in FIG. 6, which is improved, relative to FIG. 4.

Figure 7:
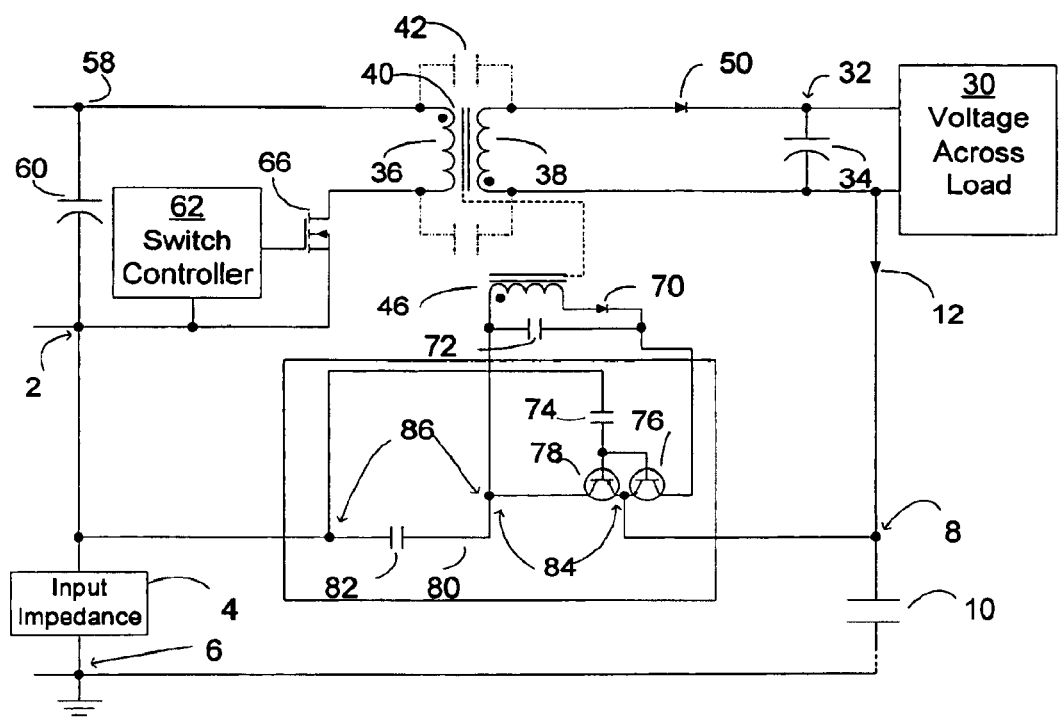
FIG. 7 is another embodiment of the invention using amplifying circuit to generate the counter-acting voltage.

FIG. 7 shows a second embodiment of the invention for providing a counter-acting voltage to reduce common mode current with the aid of an amplifying device to amplify a noise signal to provide a counter-acting voltage. The amplifying device in this embodiment is a four-terminal amplifying device formed by transistors 76 and 78 with input nodes 86 and output nodes 84. The amplifying device is driven by counter-acting winding 46, which provides power to the aforesaid amplifying device via diode 70 and across smoothing capacitor 72. The input nodes 86 sense the noise voltage across series element 82. Transistors 76 and 78, connected to provide a totem pole driver buffer circuit, amplify the sensed noise voltage and provide a corresponding counter-acting voltage across output nodes 84. The input of the totem pole driver receives the noise voltage across series element 82 and the output terminals of the totem pole driver across output nodes 84 produces the required counter-acting voltage. The totem pole output has a phase opposite to that of the noise voltage and cancels out the noise voltage between node 2 and node 8 thus reducing the common mode current.

The desirable amplification of the noise voltage is sufficient for reducing the common mode current. Of course, preferably the output counter-acting voltage should not substantially exceed the noise voltage to avoid driving a current in the other direction. In principle, common mode current could be reduced to zero with appropriate amplification and feedback. It should be noted that FIG. 7 is intended to be illustrative rather than a limitation on the scope of the invention and, accordingly, various other amplification providing architectures are intended to be within the scope of the invention.

Figure 8:
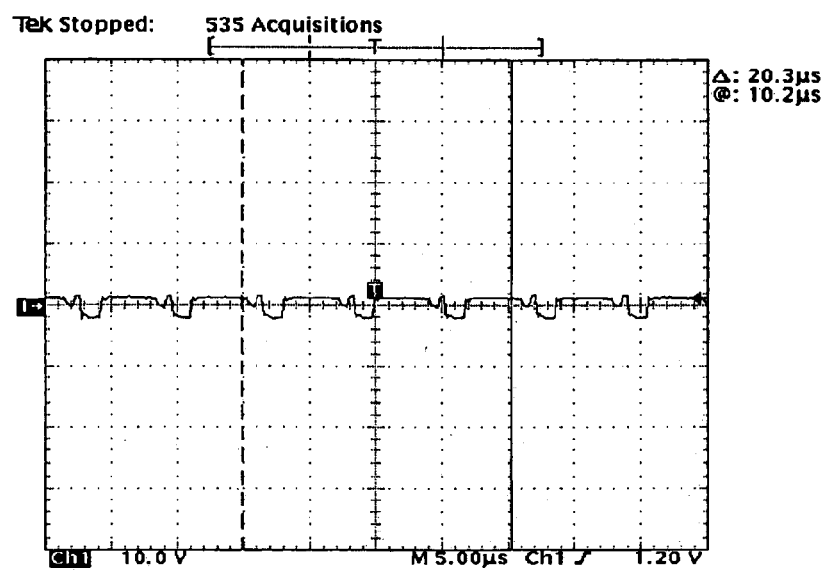
FIG. 8 shows the noise voltage across the primary and secondary non-switching nodes of the converter of FIG. 7 with reduction of common mode current in accordance with the invention.
Figure 9:
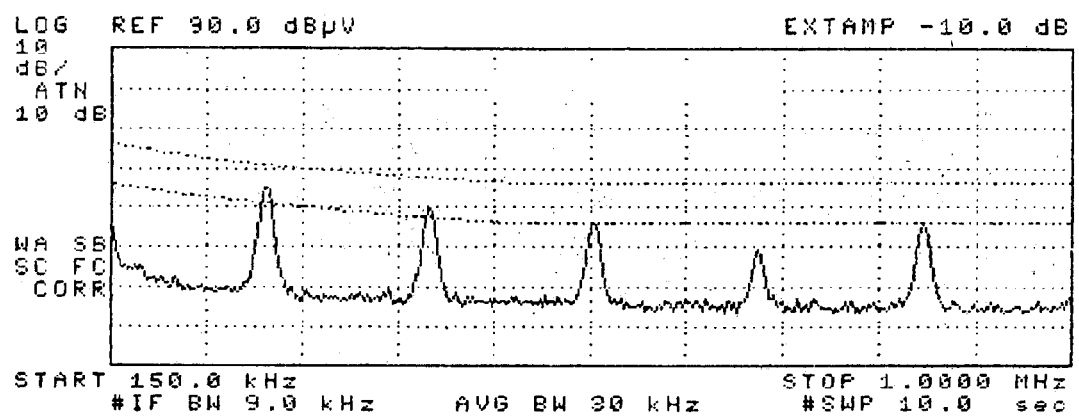
FIG. 9 illustrates the reduced common mode current corresponding to the noise voltage of FIG. 8.

FIG. 8 shows the measured noise voltage across node 2 and node 8 with the use of the amplifying architecture of FIG. 7. A comparison of FIGS. 3 and 8 reveals a significant reduction in the noise voltage across node 2 and node 8 along with the corresponding common mode current spectrum shown in FIG. 9, which, in turn, reveals the reduction in the common mode current compared to FIG. 4.

Figure 10:
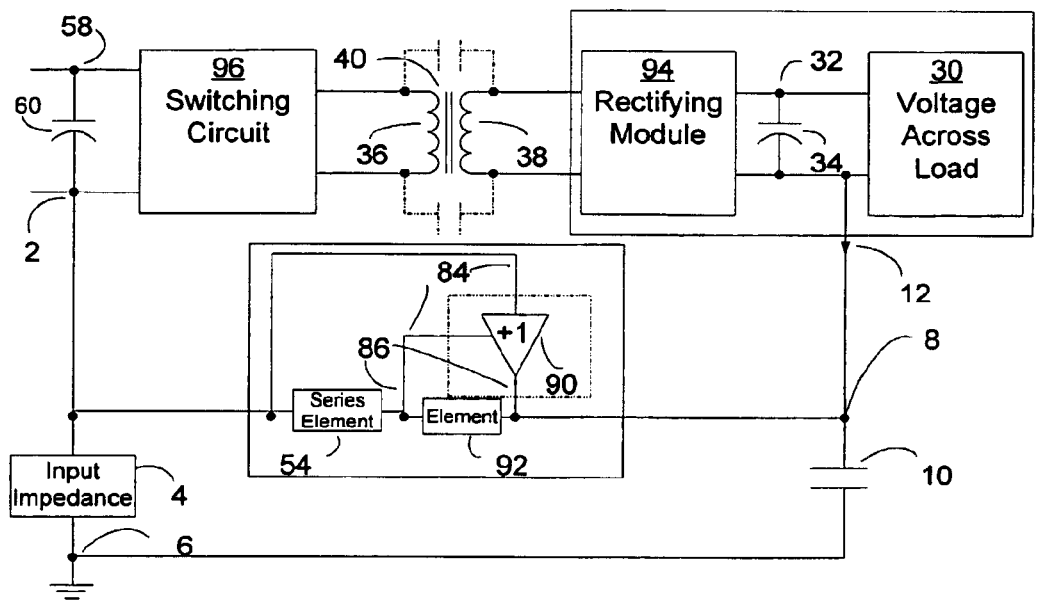
FIG. 10 illustrates another embodiment of the invention.

FIG. 10 is an exemplary implementation utilizing an amplifying device similar to the second embodiment described above. This embodiment shows a power converter with at least one switching circuit 96 and at least one rectifying module 94. The four terminal amplifying device is implemented with buffer 90. Buffer input 84 and output 86, preferably, share a common node as shown. Input terminals 84 sense noise voltage across the series element 54 and generate the counter-acting voltage as described before. Since the gain of buffer amplifier 90 generates counter-acting voltage sufficient for cancellation of the noise voltage across series element 54, no amplitude adjustment is required. However, it should be noted that specification of the amplifier gain, which is typically greater than one, should not be interpreted to be a limitation on the scope of the invention. In an additional aspect, element 92 provides frequency compensation, if desired, depending on the frequency response of buffer 90 over the noise frequency range. Series element 54 enables coupling of counter-acting voltage as previously described.

Figure 11:
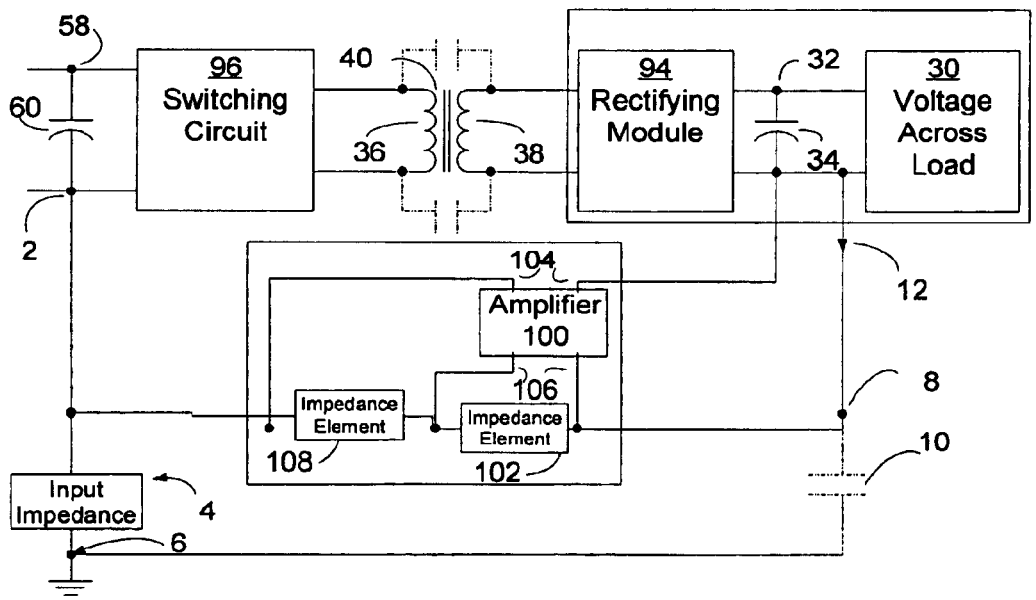
FIG. 11 illustrates yet another embodiment of the invention.

FIG. 11 illustrates another embodiment of the invention comprising a power converter with an isolation transformer. Amplifier 100 represented by a four terminal device has a pair of input 104 and output 106 terminals. Input terminals 104 accept a signal corresponding to noise voltage between converter primary and secondary sides as shown. Output terminals 106 provide a corresponding counter-acting voltage. The principle of operation is explained next.

The third embodiment shown in FIG. 11 makes use of an amplifying component to generate the counter-acting voltage to cancel out noise voltage across secondary common node 8 and primary switching circuit input terminal 2. Active component 100 generates the counter-acting voltage. Unlike the second embodiment, this embodiment senses noise voltage across nodes 2 and 8 of the primary and the secondary non-switching nodes directly. Counter-acting voltage is then generated at the output terminals of active component 100 connected across the output 106 comprising secondary node 8 and across an impedance element 102 connected back to the primary input node 2 via impedance element 108. Impedance element 108 can also be connected to other nodes with very low impedance to node 2, a typical example of such nodes being node 58 since the capacitance of input capacitor 60 is usually large enough to provide a low impedance path at the noise frequency. Element 102 is connected across active component 100 for frequency compensation if desired. It should also be noted that the active component 100 preferably provides sufficient gain at frequencies of interest to minimize error voltage, which voltage produces common mode current flowing through parasitic capacitance 10 and power source impedance to earth 6. In addition, some additional protection circuit may be required to protect the active component in order to withstand high isolation voltage between the primary and secondary as required by many safety standards.

Figure 12:
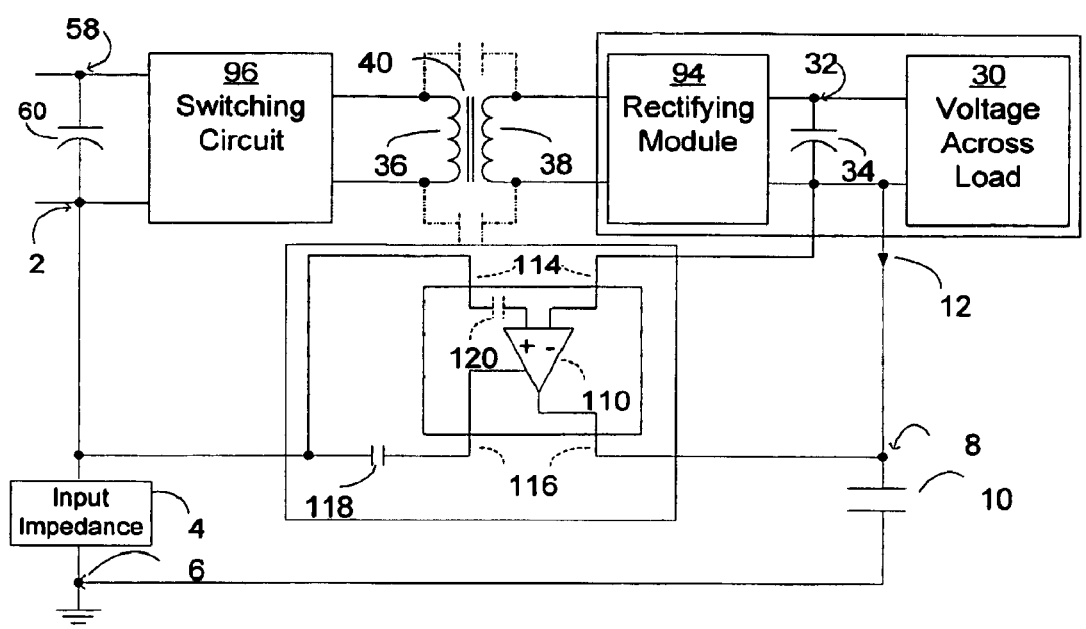
FIG. 12 shows yet another embodiment of the invention.

FIG. 12 is another implementation of the invention similar to the third embodiment described above. The four terminal amplifying device is implemented by an operational amplifier 110 and a coupling capacitor 120 for retaining isolation between primary and secondary. The input terminals of operational amplifier 110 sense the noise voltage across the primary and secondary non-switching nodes 2 and 8 respectively through coupling capacitor 120. The operational amplifier 110 generates a counter-acting voltage at output terminals 116. The counter-acting voltage is connected between the primary and secondary nodes 2 and 8 through capacitor 118 to cancel out noise across these two nodes as described before.

The embodiments described herein and the principles in accordance with the invention cover devices and systems for reducing EMI. For instance, they include a common mode noise reducing apparatus for reduction of common mode noise in a switching power converter with an input terminal and an output terminal. The common mode noise reducing apparatus includes means for sensing a potential difference signal corresponding to a potential difference between the output terminal of the switching power converter and the input terminal of the switching power converter. The term terminal includes one of, for instance, two leads used to electrical power or signals. The apparatus further includes a voltage-generating source responsive to the potential difference signal for generating a counter-acting voltage. This counter-acting voltage reduces the potential difference between the output terminal and the input terminal of the switching power converter. Furthermore, a series impedance is coupled to the voltage generating source in a path linking the at least one input terminal and the at least one output terminal via at least one capacitor.

The voltage generating source of the aforementioned common mode noise reducing apparatus can be implemented as a counter-acting winding coupled to a primary winding and to a secondary winding in a power transformer in the switching power converter. Alternatively, the voltage generating source of the aforementioned common mode noise reducing apparatus is an amplifying device receiving the signal potential difference as an input signal and producing a counter-acting voltage.

Figure 13:
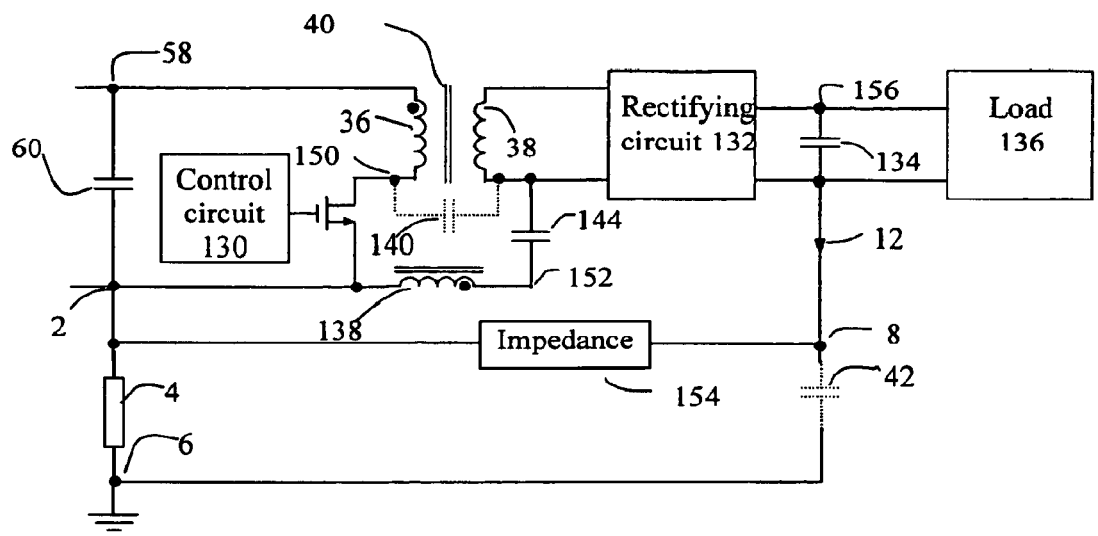
FIG. 13 illustrates and an embodiment of the invention that shows a counteracting winding that is magnetically coupled to the transformer, preferably by sharing the same magnetic core.

FIG. 13 shows an embodiment of the invention of a power converter with control circuit 130, power transformer 40 and rectifying circuit 132. Rectifying circuit 132 is coupled to output capacitor 134, which is, in turn, connected to load 136. Power transformer 40 comprises inter-winding capacitance, which is not an intended component but exist inevitably between transformer windings 36 and 38. Also shown in FIG. 13 is additional winding 138 coupled to power transformer 40. Additional winding 138, preferably acting as a counter-acting winding, is connected to non-switching input terminal node 2 or node 58, which node is connected to node 2 by a sufficiently high capacitance to provide a low impedance at the noise frequency. Parasitic capacitance 42 between the load and earth completes the path for common mode noise current through the power source impedance 4 to earth 6 and capacitance 140. In FIG. 13, impedance 154 used to bypass the common mode current is preferably a capacitor although other components may be used as well.

Additional winding 138 provides a counter-acting voltage to cancel out the switching noise voltage at winding 36, which voltage generates noise current on the secondary side through the inter-winding capacitance 140. The cancellation effect can be realized by either adjusting the capacitance 144 and the turns ratio of winding 138 to that of winding 36 such that the noise current generated by winding 36 and inter-winding capacitance 42 is cancelled by the noise current generated by winding 138 and capacitance 144 or a special arrangement of winding locations and sequences in transformer 40. In the second case, capacitor 144 is realized by winding capacitance.

Figure 14:
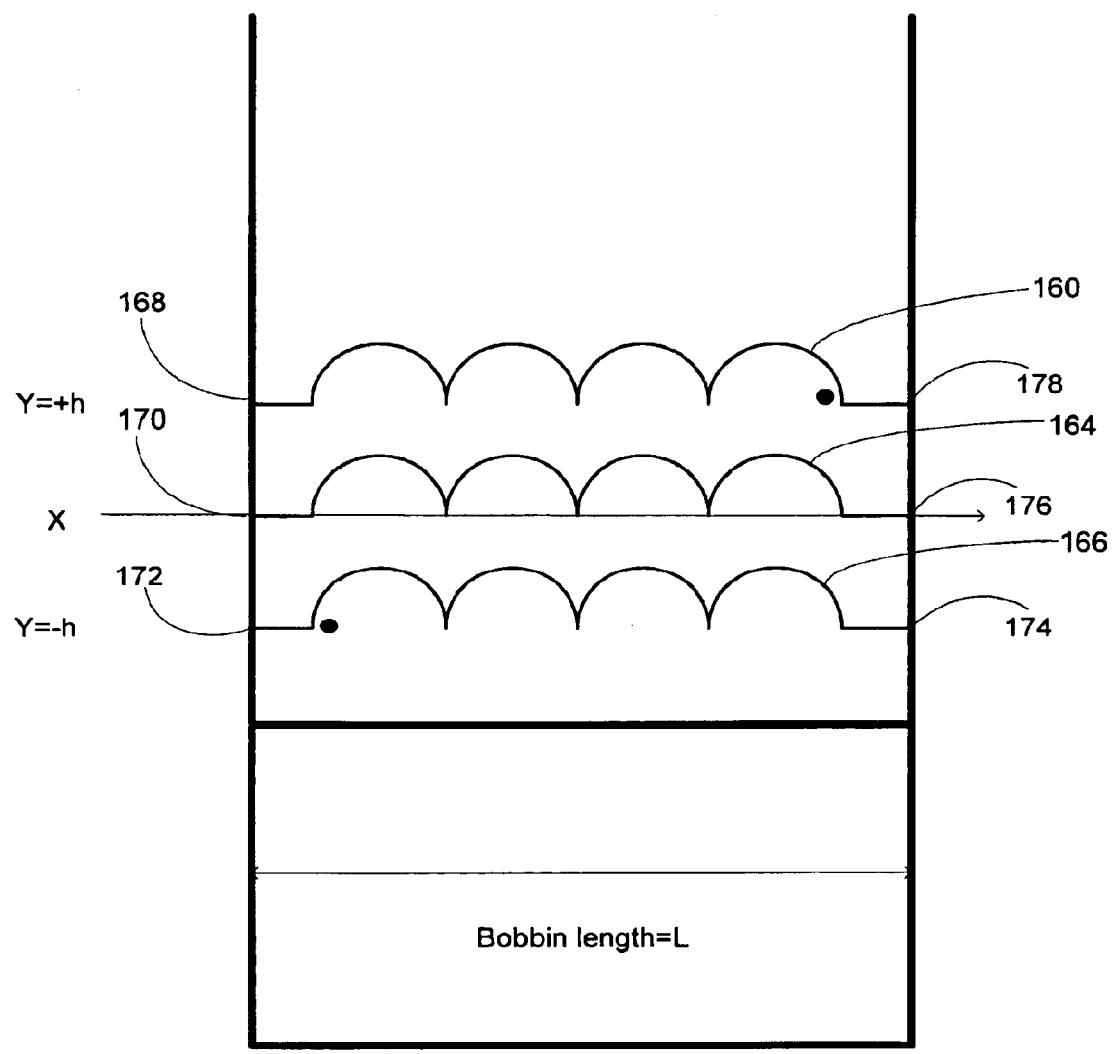
FIG. 14 illustrates a preferred strategy for winding the primary, secondary and the counter-acting windings on a bobbin.

FIG. 14 illustrates a winding arrangement in a practical bobbin for realization of noise cancellation for the arrangement illustrated in FIG. 13. The various windings are arranged such that secondary winding 38 is between primary winding 36 and counter-acting winding 138. Node 152 of winding 138 is placed on the same side and near switching node 150 of winding 36. Since node 152 has switching noise voltage out of phase with the voltage at switching node 150 of winding 36, complete switching noise cancellation can be found at a symmetrically placed location between winding 36 and counter-acting winding 138 if they have equal number of turns. Furthermore if the secondary winding 38 is placed between winding 36 and counter-acting winding 138, the primary switching noise current will flow from winding 36 to counter-acting winding 138 instead of being diverting to the secondary side through the inter-winding capacitance.

FIG. 14 illustrates how common mode noise is the cancelled by introducing counter-acting winding 138. If primary winding 36, represented as winding 166, and counter-acting winding 138, shown as winding 160, are placed at along the layer described by y=−h and y=+h respectively, then the sum of the switching noise generated by these two windings will cancel out along the symmetrical layer described by y=0 within expected error at secondary winding 38, shown as winding 164. As shown in FIG. 14, windings 160 and 166 are wound in opposite manner. End 178 of winding 160 is on the same side as end 174 of winding 166 corresponding to nodes 150 and 152 in FIG. 13. Similarly, ends 168 and 172 are on the same side and correspond to nodes 58 and 2 in FIG. 13. For the winding 164, corresponding to the secondary winding 38, the ends are 170 and 176 in FIG. 14.

However, the illustrative FIG. 14 should not be interpreted to be a limitation on the scope of the claimed invention. Instead, many other winding arrangements that provide similar cancellation may be employed within the intended scope of the claimed invention. Further, it is expected that many embodiments of the invention may not effect complete cancellation of the common mode noise at all times. The reasons may be due to design choices or even imperfect construction of various components such as transformer 40. Impedance 154 used to bypass the common mode current is preferably a capacitor although other components may be used as well.

Figure 15:
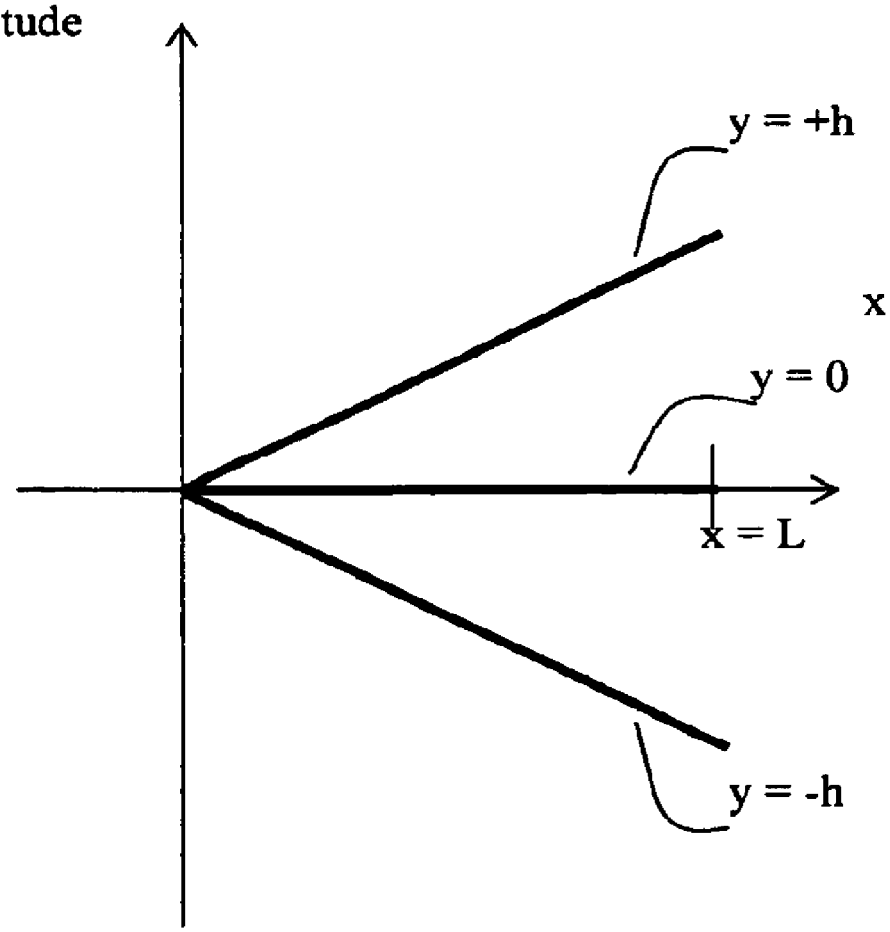
FIG. 15 shows the cancellation of the common mode noise by the various possible placements of the primary, secondary and the counter-acting windings.

FIG. 15 shows that switching noise, i.e., common mode noise, increases with distance from nodes 2 or 58. The two nodes are relatively short circuited by the low impedance capacitor 60. The two windings 138 and 36 are wound to produce voltages that exhibit a relative phase difference phase, preferably out of phase, i.e. by ±90°, to reduce the common mode noise when winding 36 and counter-acting winding 138 are placed in close proximity to each other.

The means for sensing the signal potential difference include an impedance connected in series in a path linking the input terminal and the output terminal of the switching power converter. Or alternatively, the means for sensing the signal potential difference include a counter-acting winding coupled to the primary winding and to the secondary winding.

Moreover, an electromagnetic noise-filtering element may be advantageously employed in addition to further selectively reduce current contributing to the generation of objectionable EMI.

A typical system for converting power with low common mode noise includes a switching power converter having an input terminal and an output terminal with a counter-acting winding coupled to an inductive component, and a capacitor coupled in series to the counter-acting winding to provide isolation between the output and the input.

Of course, many alternative embodiments and variations on the teachings disclosed herein are possible, as is understood by and is apparent to one of ordinary skill in the art. Such embodiments having other specific forms, structures, arrangements, proportions and with other elements, materials and components do not depart from the spirit or essential characteristics of the present invention. Therefore, the embodiments described herein being illustrative and not restrictive, such alternative embodiments and variations are intended to be included within the scope of the claims that follow this description and without the claims being limited by the foregoing description.

We claim:

1. A common mode noise reducing apparatus for reduction of common mode noise in a switching power converter, the common mode noise reducing apparatus comprising:

means for sensing a signal potential difference that is at least in part due to the common mode noise;

a voltage generating source producing a counter-acting voltage that reduces the signal potential difference; and a series impedance coupled to the voltage generating source such that the series impedance is also in a path through which the common mode noise can flow, whereby the series impedance effectively produces a short circuit for the common mode noise with the aid of the counter-acting voltage.

2. The common mode noise reducing apparatus of claim 1 wherein the voltage generating source is a counter-acting winding coupled to a primary winding and a secondary winding in a transformer in the switching power converter.

3. The common mode noise reducing apparatus of claim 1 wherein the voltage generating source includes an amplifying device having at least one input connection receiving the signal potential difference and at least one output connection coupled to the path effectively short circuiting the common mode noise.

4. The common mode noise reducing apparatus of claim 1 wherein means for sensing the signal potential difference include an impedance connected in series in the path through which the common mode noise can flow, which path includes nodes on both the input and the output sides of the switching power converter.

5. The common mode noise reducing apparatus of claim 1, wherein means for sensing the signal potential difference comprises a counter-acting winding magnetically coupled to a primary winding and a secondary winding.

6. The common mode noise reducing apparatus of claim 5, wherein further the counter-acting winding is wound with the primary and the secondary winding of a transformer in the switching power converter such that the secondary winding is between the primary winding and the counter-acting winding.

7. The apparatus of claim 6, wherein the primary winding and the counter-acting winding have substantially the same number of turns.

8. The apparatus of claim 6, wherein the secondary winding is placed between the primary and the counter-acting windings such that the sum of switching noise generated by the primary and the counter-acting windings is substantially reduced in the secondary winding.

9. A switching power converter with reduced common mode noise, the switching power converter comprising:
   a transformer with a primary winding and a secondary winding;
   at least one terminal on an input side;
   at least one terminal on an output side; and
   at least one counter-acting winding coupled to the primary winding and the secondary winding, the at least one counter-acting winding providing a counter-acting voltage to reduce a signal potential difference corresponding to the common mode noise.

10. The switching power converter of claim 9 wherein the counter-acting winding is wound on a bobbin with the primary and the secondary winding of the transformer in the switching power converter such that the secondary winding is between the primary winding and the counter-acting winding.

11. The switching power converter of claim 10, wherein the primary winding and the counter-acting winding have substantially the same number of turns.

12. The switching power converter of claim 10, wherein the secondary winding is placed between the primary and the counter-acting windings such that the sum of switching noise generated by the primary and the counter-acting windings is substantially reduced in the secondary winding.

13. The switching power converter of claim 9 further comprising a capacitor coupled in series in a path that includes, the at least one counter-acting winding, the at least one terminal on the input side and the at least one terminal on the output side, whereby reducing the common mode noise.

14. The switching power converter of claim 13 wherein the capacitor is coupled to one or more of a first node separated from an output terminal by a low impedance and a second node separated from an input terminal by a low impedance.

15. The switching power converter of claim 9 further including an electromagnetic noise-filtering element.

16. The switching power converter of claim 9 further comprising an electromagnetic noise-filtering element coupled to the counter-acting winding.

17. A method for reduction of common mode noise comprising:
   providing a switching power converter having an input side terminal and an output side terminal;
   providing means for sensing a signal potential difference corresponding to a common mode noise;
   providing an amplifying device having at least one input connection that receives the signal potential difference, and at least one output connection that provides a counter-acting voltage in response to the signal potential difference; and
   providing means for coupling the at least one output connection of the amplifying device to a path connecting the input terminal to the output terminal whereby the counter-acting voltage produced by the amplifying device reduces the potential difference between the input side terminal and the output side terminal.

18. The method of claim 17 wherein the means for sensing a signal potential difference includes a counter-acting winding that produces a counter-acting voltage, wherein further the counter-acting winding is wound on a bobbin with a primary and a secondary winding of a transformer in the switching power converter such that the secondary winding is between the primary winding and the counter-acting winding.

19. The method of claim 18, wherein the primary winding and the counter-acting winding have substantially the same number of turns.

20. The method of claim 18, wherein the secondary winding is placed between the primary and the counter-acting windings such that the sum of switching noise generated by the primary and the counter-acting windings is substantially reduced in the secondary winding.

21. The method of claim 18, further comprising coupling an electromagnetic noise-filtering element to the counter-acting winding.

* * * * *